United States Patent
Ma et al.

(10) Patent No.: US 11,586,861 B2
(45) Date of Patent: Feb. 21, 2023

(54) EMBEDDINGS + SVM FOR TEACHING TRAVERSABILITY

(71) Applicant: Toyota Research Institute, Inc., Los Altos, CA (US)

(72) Inventors: Jeremy Ma, Pasadena, CA (US); Krishna Shankar, Los Altos, CA (US); Kevin Stone, Palo Alto, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 490 days.

(21) Appl. No.: 16/697,290

(22) Filed: Nov. 27, 2019

(65) Prior Publication Data
US 2021/0081724 A1    Mar. 18, 2021

Related U.S. Application Data (60) Provisional application No. 62/900,091, filed on Sep. 13, 2019.

(51) Int. Cl.
| | |
|---|---|
| G06K 9/62 | (2022.01) |
| G06N 5/04 | (2006.01) |
| G06N 3/08 | (2006.01) |
| G06N 20/10 | (2019.01) |
| G06N 3/04 | (2006.01) |

(52) U.S. Cl.
CPC ......... *G06K 9/6269* (2013.01); *G06K 9/6286* (2013.01); *G06N 3/04* (2013.01); *G06N 3/08* (2013.01); *G06N 5/04* (2013.01); *G06N 20/10* (2019.01)

(58) Field of Classification Search
CPC .. G06K 9/6256; G06K 9/6263; G06K 9/6269; G06K 9/6286; G06N 20/10; G06N 3/008; G06N 3/08; G06N 5/04; G06V 20/56
See application file for complete search history.

(56) References Cited

U.S. PATENT DOCUMENTS
| | | |
|---|---|---|
| 9,305,219 B2 | 4/2016 | Ramalingam et al. |
| 2009/0297032 A1 | 12/2009 | Loui et al. |
| 2017/0026612 A1 | 1/2017 | Rintel et al. |

(Continued)

FOREIGN PATENT DOCUMENTS
| | | |
|---|---|---|
| CN | 109117690 A | 1/2019 |
| CN | 109117691 A | 1/2019 |
| GB | 2554481 A | 4/2018 |

*Primary Examiner* — Ruiping Li
(74) *Attorney, Agent, or Firm* — Dinsmore & Shohl LLP (57) ABSTRACT

A system includes a memory module configured to store image data captured by a camera and an electronic controller communicatively coupled to the memory module. The electronic controller is configured to receive image data captured by the camera, implement a neural network trained to predict a drivable portion in the image data of an environment. The neural network predicts the drivable portion in the image data of the environment. The electronic controller is configured to implement a support vector machine. The support vector machine determines whether the predicted drivable portion of the environment output by the neural network is classified as drivable based on a hyperplane of the support vector machine and output an indication of the drivable portion of the environment.

20 Claims, 5 Drawing Sheets

(56) References Cited

U.S. PATENT DOCUMENTS

| | | | |
|---|---|---|---|
| 2017/0287170 A1* | 10/2017 | Perona | G06V 20/10 |
| 2018/0239969 A1 | 8/2018 | Lakehal-ayat et al. | |
| 2019/0080604 A1 | 3/2019 | Yogamani et al. | |
| 2021/0063578 A1* | 3/2021 | Wekel | G06K 9/6271 |

* cited by examiner

EMBEDDINGS + SVM FOR TEACHING TRAVERSABILITY

CROSS-REFERENCE TO RELATED APPLICATION

This application claims the benefit of U.S. Provisional Patent Application No. 62/900,091 filed on Sep. 13, 2019, the entire contents of which are incorporated herein by reference.

TECHNICAL FIELD

The present specification generally relates to a classifier system. More specifically, the present specification relates to systems and methods for classifying drivable and non-drivable portions of image data of an environment.

BACKGROUND

In general, when an autonomous system enabled by a neural network encounters a new environment that the neural network has not been previously trained within, the neural network may make incorrect predictions or determinations. To improve the operation of the neural network, the neural network generally needs to be retrained with training data including new or additional data related to the new environment. The process of retraining a neural network is time consuming, resource intensive, and generally requires the system implementing the neural network to be taken offline while the neural network is retrained.

Accordingly, there is a need for a systems and methods that enable an autonomous system, such as a robot, to adapt to new environments and improve its ability to perform classification tasks in new environments without offline retraining of the neural network.

SUMMARY

In one embodiment, a system includes a memory module configured to store image data captured by a camera and an electronic controller communicatively coupled to the memory module. The electronic controller is configured to receive image data captured by the camera, implement a neural network trained to predict a drivable portion in the image data of an environment, where the neural network predicts the drivable portion in the image data of the environment, implement a support vector machine, where the support vector machine determines whether the predicted drivable portion of the environment output by the neural network is classified as drivable based on a hyperplane of the support vector machine, and output an indication of the drivable portion of the environment.

In some embodiments, a method for predicting drivable portions of an environment includes receiving, with an electronic controller, image data captured by a camera; implementing, with the electronic controller, a neural network trained to predict a drivable portion in the image data of the environment; predicting, with the neural network, the drivable portion in the image data of the environment; implementing, with the electronic controller, a support vector machine; determining, with the support vector machine, whether the predicted drivable portion of the environment output by the neural network is classified as drivable based on a hyperplane of the support vector machine; and outputting an indication of the drivable portion of the environment.

In some embodiments, a method for predicting drivable portions of an environment includes receiving, with an electronic controller, image data captured by a camera; annotating the image data through a user interface generated by the electronic controller on a display, where one or more portions of the image data are annotated as drivable using an interactive tool; implementing, with the electronic controller, a support vector machine configured to receive a prediction of a drivable portion of the environment from a neural network trained to predict the drivable portion of the environment; and updating a hyperplane of the support vector machine based on the annotated image data such that a constraint defining the hyperplane is changed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure include systems and methods that provide a classifier system configured to classify drivable and non-drivable portions of image data of an environment. More specifically, the present disclosure relates to classifier systems and methods that implement a neural network and a support vector machine ("SVM") in a unique configuration that enables online updating of the classifier system without the need to retrain the neural network when a new environment is presented to the classifier system. As used herein "online" or "online updating" refers to the capability of updating the classifier system while as the data from an environment is captured and processed as opposed of "offline" where a static predefined dataset is utilized for training or updating the classifier system. In embodiments, a neural network receives image data of an environment. The image data may be obtained directly from a robot camera, for example, or may be retrieved from a memory module of the electronic controller. The neural network is trained to generate an initial prediction of drivable portions of an environment. The neural network may perform operations such as feature extraction and the like on the image data. In some embodiments, operations such as pixel-wise, traversability analysis, and embeddings may be performed on the input image data to predict and/or determine drivable portions of image data of an environment.

As used herein, "portions" and "portions of image data" refer to one or more pixels of an image. Moreover, the classifier system generates a prediction for each pixel or a group of pixels (which are referred to herein as "portions" and "portions of image data") as to whether a robot or vehicle can traverse that portion of the environment represented by the pixel or group of pixels of the image data. The system may associate a 16 or more digit value that defines each pixel value to a drivable or non-drivable indication. Moreover, as the system analyzes groups of pixels and the groupings of values that define each pixel within the group, the system (e.g., the neural network) may learn patterns of groups of pixels which result in drivable and non-drivable areas within an environment. However, this is only one example of how system may learn to predict drivable and non-drivable portions of image data of an environment.

The output of the neural network may then be processed by a support vector machine where a defined hyperplane within the support vector machine may refine the prediction and/or determination. The addition of the support vector machine having a defined and adjustable hyperplane provides a convenient update ability to the classifier system. That is, when a new environment or correction to the classifier system needs to be made to improve predictions and/or determinations of drivable portions of an environment, annotated image data may be used to adjust the hyperplane, rather than requiring the neural network to be completely retrained. The hyperplane confirms and/or updates predictions of drivable and non-drivable portions of image data of an environment generated by the neural network. Therefore, by adjusting the hyperplane of the support vector machine, predictions and/or determinations of portions of image data that may be incorrectly determined as drivable or non-drivable by the neural network may subsequently and more correctly defined as non-drivable or drivable once processed by the support vector machine.

In some embodiments, outputs from the support vector machine may be updated via a user interface configured to enable a user to electronically paint (i.e., graphically label) portions of the image data of an environment that should be identified as drivable or non-drivable, but were predicted as non-drivable or drivable by the neural network, respectively. The annotated environment image data may be fed back into the support vector machine such that the hyperplane defining the classification of the predictions generated by the neural network is updated as necessary. Updating the one or more hyperplanes of the support vector machine may include updating one or more of the following parameters: the regularization parameter, the gamma parameter, and/or the margin. The regularization parameter of the support vector machine defines how much misclassification should be avoided. That is, the regularization parameter defines a degree of importance that is given to miss-classifications such that as the regularization parameter increases the less the wrongly classified examples are allowed and when the regularization parameter tends to 0 (without being 0) the more the miss-classifications are allowed.

The gamma parameter of the support vector machine defines how far the influence of a single training example reaches, where low values mean 'far' and high values mean 'close'. In other words, with low gamma, points far away from the plausible hyperplane are considered in calculation for the hyperplane, whereas high gamma means the points close to the plausible hyperplane are considered in calculation. The margin defines an objective of the support vector machine. That is, an objective of the support vector machine is to identify the optimal separating hyperplane which maximizes the margin between the data. In other words, maximizing the distance between the nearest points of each class and the hyperplane would result in an optimal separating hyperplane. In some embodiments, updating the hyperplane causes one or more of the constraints of the formula defining the hyperplane to be adjust such that the hyperplane is further optimized to the dataset (e.g., training data) which the support vector machine is trained to classify.

In further embodiments described herein, once the neural network is trained, additional training data from new environments may be fed into the support vector machine such that the support vector machine may adjust the hyperplane to account for the new training data while remaining online. Introduction of new training data may also include updating one or more parameters of the hyperplane to effect adjustments to the hyperplane. Moreover, to validate that a change to the hyperplane does not incorrectly bias the classifier system, one or more validation images from a set of validation image data may be processed by the system whereby the output predicted drivable portions are compared to known drivable portions in the validation image. If the validation image and the predicted drivable portions output by the neural network/support vector machine combination align with each other within a predefined acceptance threshold then the adjustment to the classifier system is determined to be valid.

The following will now describe these systems and methods in more detail with reference to the drawings and where like numbers refer to like structures.

Figure 1:
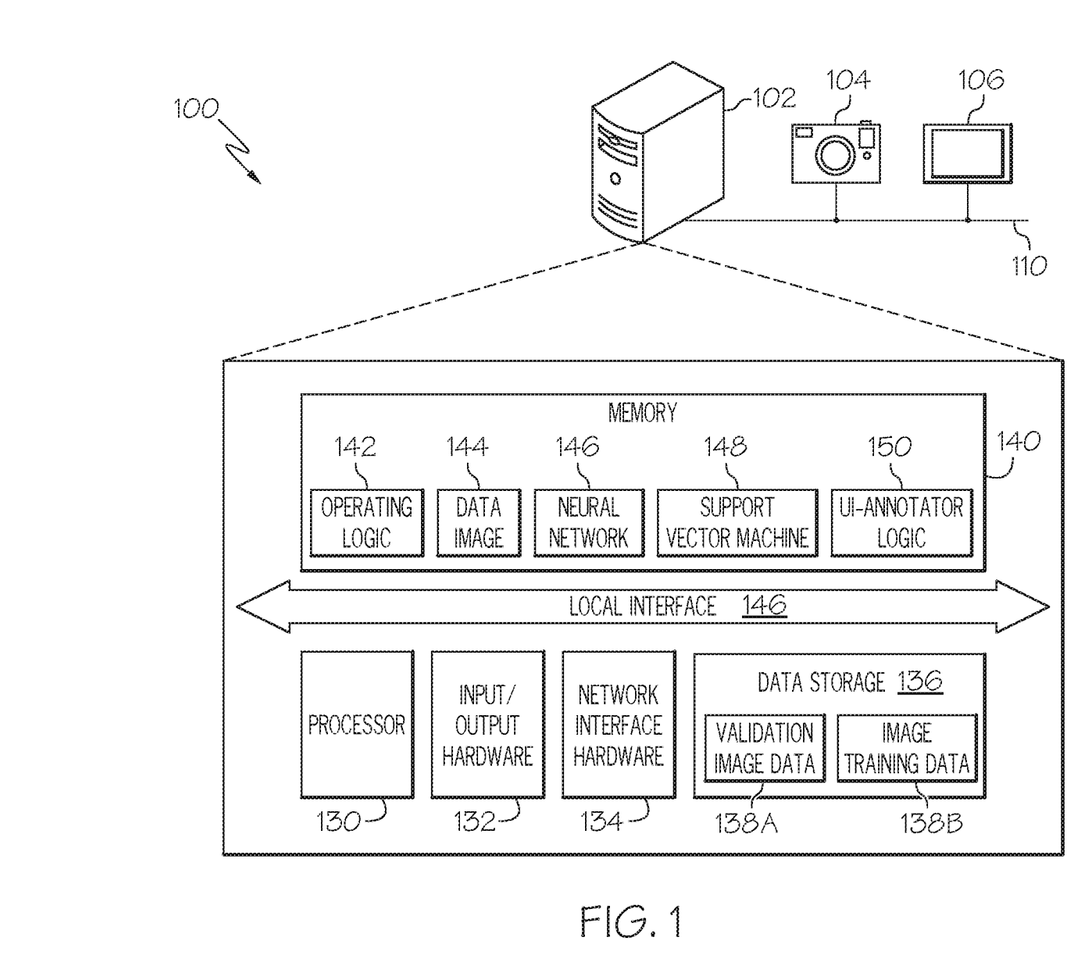
FIG. 1 schematically depicts an example system employing a classifier system based on a neural network and support vector machine according to one or more embodiments shown and described herein.

Referring now to FIG. 1, an example system employing a classifier system based on a neural network and support vector machine is depicted. FIG. 1 depicts a system 100 having an electronic controller 102 communicatively coupled to a camera 104 and a display 106 via a communication bus 110. The electronic controller 102 may be an electronic controller for a robot system, an autonomous vehicle, or the like. The electronic controller 102 may be configured to perform many various operations, however, operations related to the systems and methods for classifying drivable and non-drivable portions of an environment are described herein. In some embodiments, the system 100 is implement in a robot or a vehicle, more specifically, an autonomous vehicle.

The electronic controller 102 may be communicatively coupled to the camera 104 via a communication bus 110. While only one camera is depicted and described herein it is understood that the system may include more than one camera. The camera 104 may be any device having an array of sensing devices (e.g., pixels) capable of detecting radiation in an ultraviolet wavelength band, a visible light wavelength band, or an infrared wavelength band. The camera 104 may have any resolution. The camera 104 may be an omni-directional camera, or a panoramic camera, for example. In some embodiments, the camera 104 may be an imaging depth camera such as an RGB-D (e.g., an Intel® RealSense™ Depth Camera) or another device capable of capturing depth measurements in an environment or capturing image data capable of being analyzed to determine depths in an environment based on the image data. In some embodiments, one or more optical components, such as a mirror, fish-eye lens, or any other type of lens may be optically coupled to each of the camera 104.

The electronic controller 102 may be communicatively coupled to the display 106 via a communication bus 110. The display 106 may be a display device. The display 106 may include any medium capable of transmitting an optical output such as, for example, a cathode ray tube, light emitting diodes, a liquid crystal display, a plasma display, or the like. Additionally, the display 106 may also include one or more input devices. The one or more input devices may be any device capable of transforming user contact into a data signal that can be transmitted over the communication bus 110 such as, for example, a keyboard, a button, a switch, a knob, a microphone, or the like. In some embodiments, the one or more input devices include a power button, a volume button, an activation button, a scroll button, or the like. The one or more input devices may be provided so that the user may interact with the display 106, such as to navigate menus, make selections, set preferences, and other functionality described herein. In some embodiments, the input device includes a pressure sensor, a touch-sensitive region, a pressure strip, or the like.

The communication bus 110 may be formed from any medium that is capable of transmitting a signal such as, for example, conductive wires, conductive traces, optical waveguides, or the like. The communication bus 110 may also refer to the expanse in which electromagnetic radiation and their corresponding electromagnetic waves traverses. Moreover, the communication bus 110 may be formed from a combination of mediums capable of transmitting signals. In one embodiment, the communication bus 110 comprises a combination of conductive traces, conductive wires, connectors, and buses that cooperate to permit the transmission of electrical data signals to components such as processors, memories, sensors, input devices, output devices, and communication devices. Accordingly, the communication bus 110 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication bus 110 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

Turning to the electronic controller 102, the electronic controller 102 may utilize hardware, software, and/or firmware, according to embodiments shown and described herein. While in some embodiments, the electronic controller 102 may be configured as a general-purpose computer with the requisite hardware, software, and/or firmware, in some embodiments, the electronic controller 102 may be configured as a special purpose computer designed specifically for performing the functionality described herein.

As illustrated in FIG. 1, the electronic controller 102 may include a processor 130, input/output hardware 132, network interface hardware 134, a data storage component 136, which stores validation image data 138A and/or training image data 138B, and a memory module 140. The memory module 140 may be machine readable memory (which may also be referred to as a non-transitory processor readable memory). The memory module 140 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory module 140 may be configured to store operating logic 142, image data 144, logic for implementing a neural network 146, logic for implementing a support vector machine 148, and/or logic for implementing a user interface annotator 150 (each of which may be embodied as a computer program, firmware, or hardware, as an example). A local interface 246 is also included in FIG. 1 and may be implemented as a bus or other interface to facilitate communication among the components of the electronic controller 102.

The processor 130 may include any processing component(s) configured to receive and execute programming instructions (such as from the data storage component 136 and/or the memory module 140). The instructions may be in the form of a machine readable instruction set stored in the data storage component 136 and/or the memory module 140. The input/output hardware 132 may include a monitor, keyboard, mouse, printer, camera, microphone, speaker, and/or other device for receiving, sending, and/or presenting data. The network interface hardware 134 may include any wired or wireless networking hardware, such as a modem, LAN port, Wi-Fi card, WiMax card, mobile communications hardware, and/or other hardware for communicating with other networks and/or devices.

It should be understood that the data storage component 136 may reside local to and/or remote from the electronic controller 102 and may be configured to store one or more pieces of data for access by the electronic controller 102 and/or other components. As illustrated in FIG. 1, the data storage component 136 stores validation image data 138A. The validation image data 138A includes images of an environment and corresponding annotations defining drivable and non-drivable portions within the images. The validation image data 138A may include one or more images and associated annotations for confirming the functionality of the classifier system when online updates are made to the hyperplane of the support vector machine. The data storage component 136 stores training image data 138B. The training image data 138B includes images of an environment and corresponding annotations defining drivable and non-drivable portions of the image data that are used to train the neural network and the support vector machine.

In some embodiments, the training image data 138B include images of an environment captured by a camera 104 and annotated to identify drivable and non-drivable portions of the image data of the environment. In some embodiments, annotation of the image data as drivable may be generated automatically. For example, images captured along the path of the robot are recorded as well as the path the robot traverses. The path the robot traverses may be overlaid within the collected image data indicating a drivable portion since the robot traversed the path at least once when collecting the image data. This is only one method in which training data may be collected for training the neural network 200 which is described in more detail herein with reference to FIG. 2.

Included in the memory module 140 are the operating logic 142, image data 144, logic for implementing a neural network 146, logic for implementing a support vector machine 148, and/or logic for implementing a user interface annotator 150. The operating logic 142 may include an operating system and/or other software for managing components of the electronic controller 102. The image data 144 includes images of an environment captured from a camera 104. The image data 144 may be images, depth images, or the like captured by the camera 104. The logic for implementing a neural network 146 may include hardware, software, firmware or a combination thereof that implements a neural network 146. The logic includes logic for training the neural network and/or logic for implementing the neural network 146 with the support vector machine. The logic for implementing the support vector machine 148 may include hardware, software, firmware or a combination thereof that implements a support vector machine 148. The logic includes logic for generating a hyperplane, updating a hyperplane, validating a hyperplane, and configuring an output prediction of drivable and/or non-drivable portions of the environment based on image data 144 and the output from the neural network.

The memory module 140 further includes a user interface annotator logic 150. The user interface annotator logic 150 is logic that enables a user to view raw image data, view image data including an overlay of a prediction of drivable and non-drivable portions of the environment, and/or interactive features that a user may interact with to edit and/or annotate the drivable and/or non-drivable portions in the image data. The interactive features may include a painting-like interface tool which a user may select a paint option for identifying drivable portions or a paint option for identifying non-drivable portions. As described in more detail herein, the user interface annotator logic 150 provides a user interface on a display, displays image data, and provides an interactive tool (e.g., a graphical user interface "GUI") for editing or annotating drivable portions of the environment captured in the image data.

Figure 2:
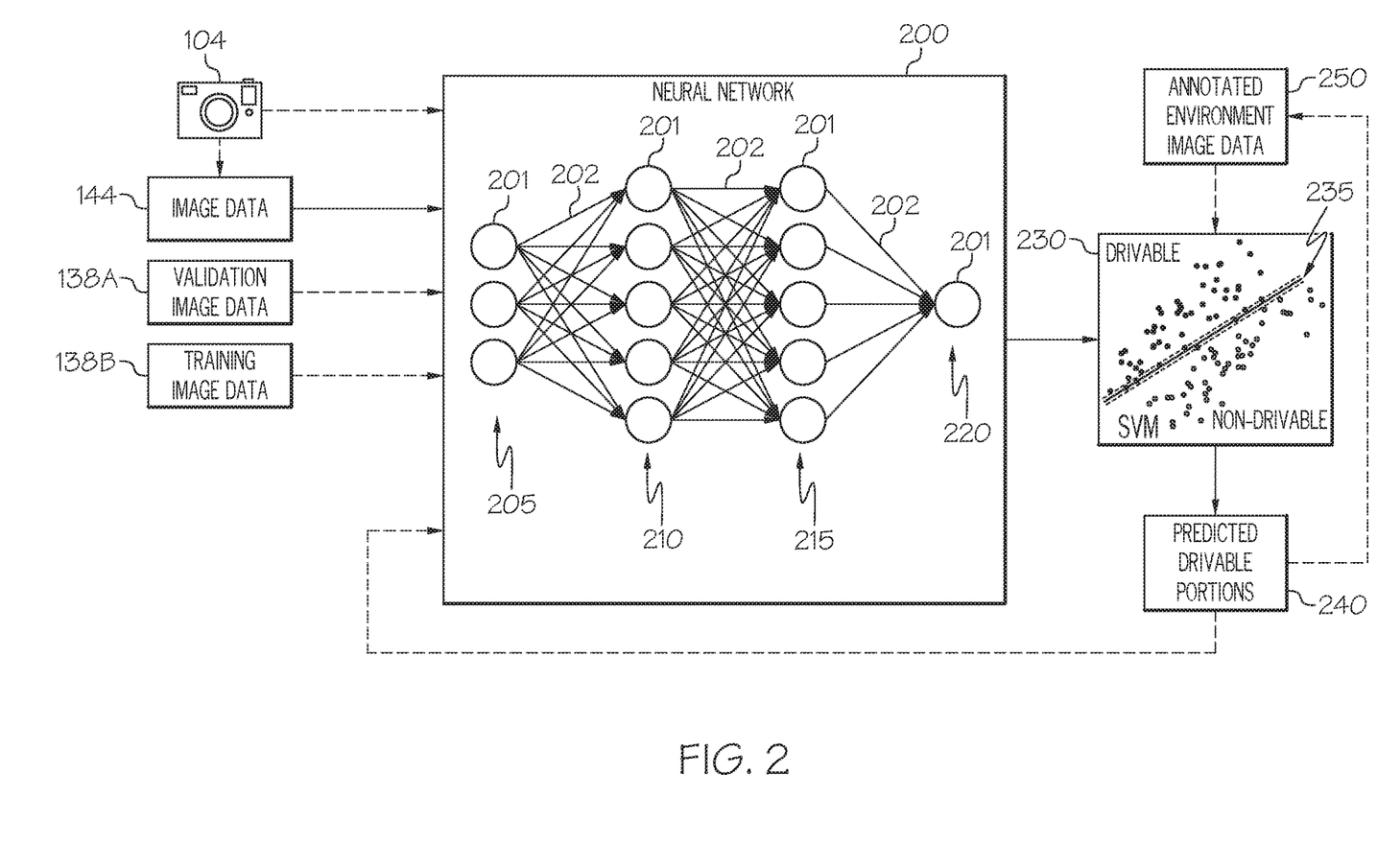
FIG. 2 depicts an illustrative diagram for the classifier system implementing a neural network model having a support vector machine for predicting or determining drivable portions of an environment according to one or more embodiments shown and described herein.

Turning now to FIG. 2, an illustrative diagram for the classifier system implementing a neural network 200 having a support vector machine 230 for predicting and/or determining drivable portions of an environment is depicted. In some embodiments, the neural network 200 may include one or more layers 205, 210, 215, 220, having one or more nodes 201, connected by node connections 202. The one or more layers 205, 210, 215, 220 may include an input layer 205, one or more hidden layers 210, 215, and an output layer 220. The input layer 205 represents the raw information that is fed into the neural network 200. For example, image data 144 from a camera 104 or a memory module 140, validation image data 138A for validating online updates to the classifier system, and/or training image data 138B for training the neural network and establishing a hyperplane of the support vector machine may be input into the neural network 200 at the input layer 205. During training, the predicted drivable portions 240 may also be fed back into the neural network 200 or back propagated to train the neural network paths. The neural network 200 processes the raw information received at the input layer 205 through nodes 201 and node connections 202. The one or more hidden layers 210, 215, depending on the inputs from the input layer 205 and the weights on the node connections 202, carry out computational activities. In other words, the hidden layers 210, 215 perform computations and transfer information from the input layer 205 to the output layer 220 through their associated nodes 201 and node connections 202.

In general, when a neural network 200 is learning, the neural network 200 is identifying and determining patterns within the raw information received at the input layer 205. In response, one or more parameters, for example, weights associated to node connections 202 between nodes 201, may be adjusted through a process known as back-propagation. It should be understood that there are various processes in which learning may occur, however, two general learning processes include associative mapping and regularity detection. Associative mapping refers to a learning process where a neural network 200 learns to produce a particular pattern on the set of inputs whenever another particular pattern is applied on the set of inputs. Regularity detection refers to a learning process where the neural network learns to respond to particular properties of the input patterns. Whereas in associative mapping the neural network stores the relationships among patterns, in regularity detection the response of each unit has a particular 'meaning'. This type of learning mechanism may be used for feature discovery and knowledge representation.

Neural networks possess knowledge that is contained in the values of the node connection weights. Modifying the knowledge stored in the network as a function of experience implies a learning rule for changing the values of the weights. Information is stored in a weight matrix W of a neural network. Learning is the determination of the weights. Following the way learning is performed, two major categories of neural networks can be distinguished: 1) fixed networks in which the weights cannot be changed (i.e., dW/dt=0), and 2) adaptive networks which are able to change their weights (i.e., dW/dt not=0). In fixed networks, the weights are fixed a priori according to the problem to solve.

In order to train a neural network 200 to perform some task, adjustments to the weights are made in such a way that the error between the desired output and the actual output is reduced. This process may require that the neural network 200 computes the error derivative of the weights (EW). In other words, it must calculate how the error changes as each weight is increased or decreased slightly. A back propagation algorithm is one method that is used for determining the EW.

The algorithm computes each EW by first computing the error derivative (EA), the rate at which the error changes as the activity level of a unit is changed. For output units, the EA is simply the difference between the actual and the desired output. To compute the EA for a hidden unit in the layer just before the output layer, first all the weights between that hidden unit and the output units to which it is connected are identified. Then, those weights are multiplied by the EAs of those output units and the products are added. This sum equals the EA for the chosen hidden unit. After calculating all the EAs in the hidden layer just before the output layer, in like fashion, the EAs for other layers may be computed, moving from layer to layer in a direction opposite to the way activities propagate through the neural network 200, hence "back propagation". Once the EA has been computed for a unit, it is straight forward to compute the EW for each incoming connection of the unit. The EW is the product of the EA and the activity through the incoming connection. It should be understood that this is only one method in which a neural network 200 is trained to perform a task.

Still referring to FIG. 2, the neural network 200 may include one or more hidden layers 210, 215 that feed into one or more nodes 201 of an output layer 220. There may be one or more output layers 220 depending on the particular output the neural network 200 is configured to generate.

In embodiments described herein, a support vector machine 230 may be configured to receive an output from neural network 200 and further predict or determine drivable and/or non-drivable portions of the environment based on a hyperplane 235 of the support vector machine 230. For example, as new terrain is encountered, the classifier system (also referred to as the traversability network) can generate new examples of drivable and non-drivable scenarios. These may be added as positive and negative examples to the support vector machine 230 to adjust the parameters of the hyperplane 235, thus adjusting the hyperplane 235 to a more optimal hyperplane accounting for the new and/or variations in previously analyzed datasets.

In general, a support vector machine 230 is a type of a supervised machine learning algorithm which can be used for both classification and regression problems. Support vector machines follow a technique called the kernel method to transform the data and based on these transformations find an optimal boundary (e.g., a hyperplane 235) between the possible outputs (e.g., drivable and non-drivable portions of an environment). A support vector machine 230 can perform complex data transformations to determine how to separate data based on the labels or outputs defined. The hyperplane 235 defines the separation in the dataset. The hyperplane is an n−1 dimensional subspace of an n-dimensional Euclidean space. For example, if the dataset is 1D, a single point represents the hyperplane; if the dataset is 2D, the hyperplane is a line; if the dataset is 3D, the hyperplane is a plane; and so on. In some embodiments, one or more hyperplanes may be defined that separate classes of data.

Referring back to the classifier system more generally, in some embodiments, the classifier system utilizes depth information collected from the camera 104 or depth information that is determined through a depth image processing algorithm of the image data 144. The depth information of the environment may indicate elevations, heights, and/or other dimensions of objects in the environment. For example, when an elevation, height, or other dimension of an object is greater than a predefined traversable dimension (e.g., an elevation that the robotic system or vehicle can traverse), the portion of the environment is determined to be non-drivable. It is understood that there are various techniques for determining or estimating elevations and/or depths from image data (e.g., RGB image data) or by utilizing other depth measuring techniques.

Figure 3:
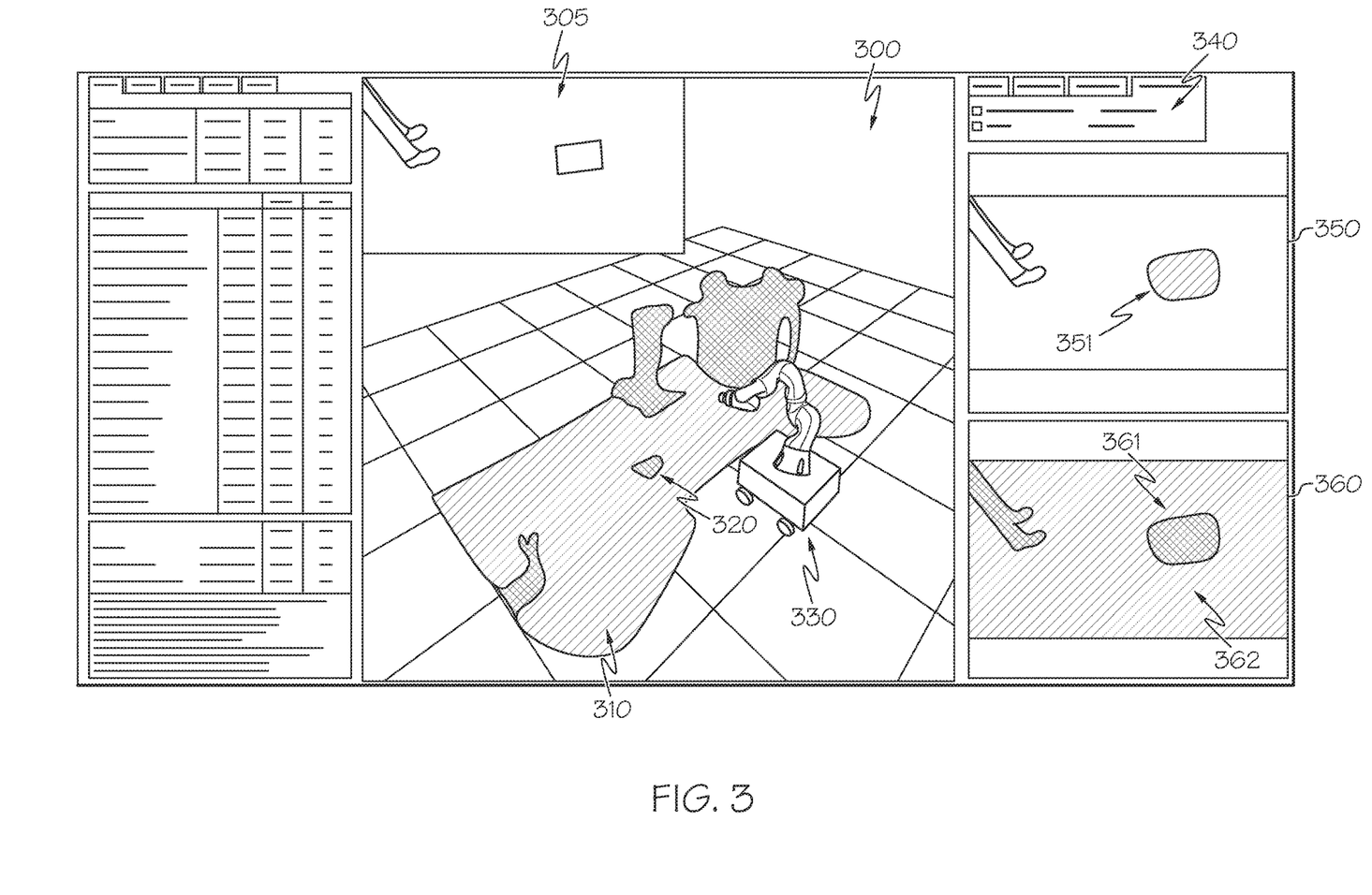
FIG. 3 depicts an illustrative user interface configured for editing and/or annotating drivable and non-drivable portions of image data of an environment according to one or more embodiments shown and described herein.
Figure 4:
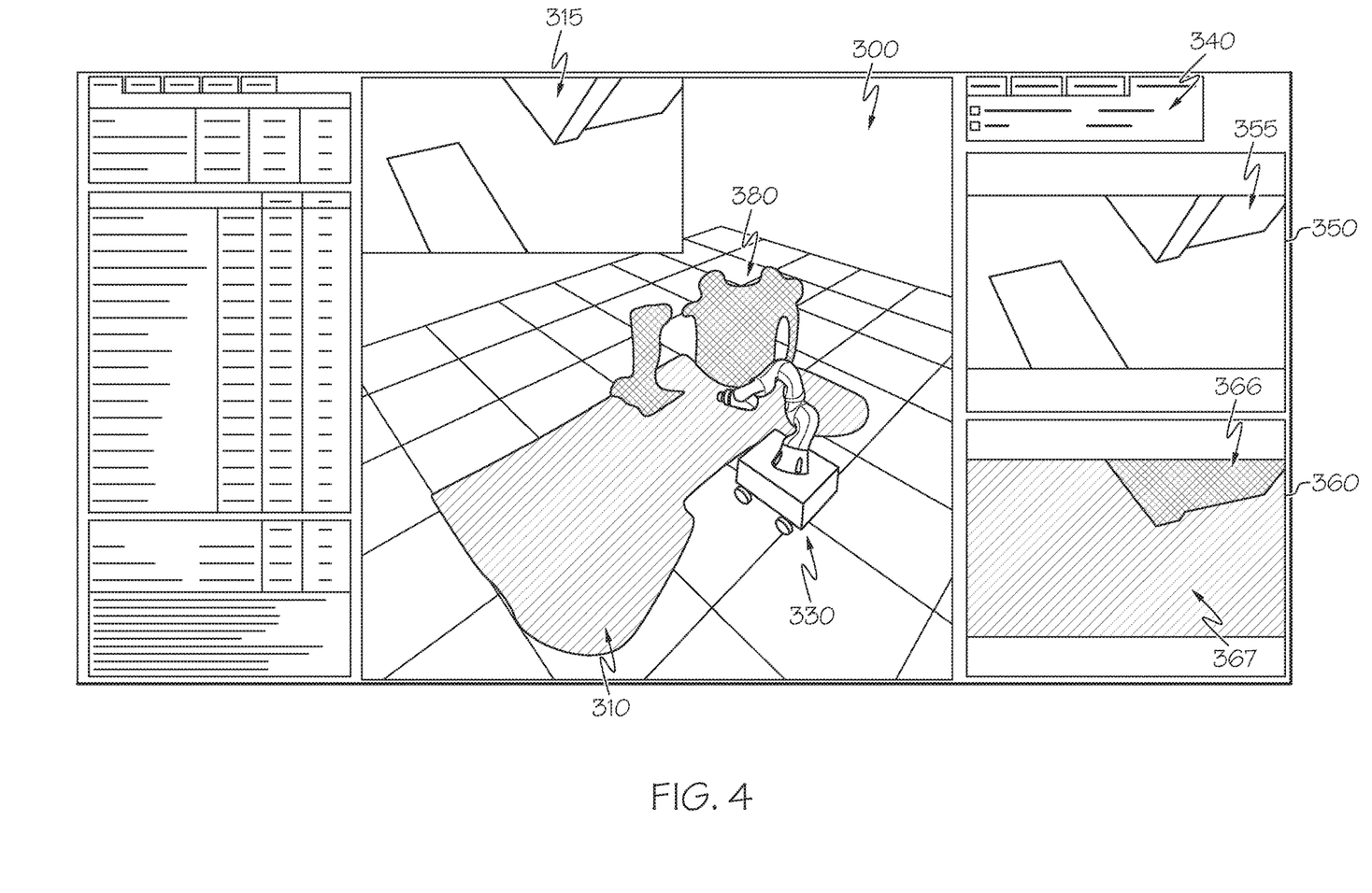
FIG. 4 depicts an illustrative user interface configured for editing and/or annotating drivable and non-drivable portions of image data of an environment according to one or more embodiments shown and described herein.

It should be understood that training the classifier system is an iterative process and may include user interactions to perfect and tune the predictions made by the neural network 200 and determinations and/or classifications made by the support vector machine 230. In some embodiments, a user interface is provided so that a user may edit or annotate image data thereby defining elevations, heights or other dimensions or portions of the image data of the environment that the robotic system or vehicle is capable and/or not capable of traversing. For example, FIGS. 3 and 4 provide an illustrative example of a user interface configured for editing and/or annotating drivable and non-drivable portions of image data of an environment. Referring to FIG. 3, an illustrative user interface is depicted. The user interface may display an environment model 300 with colored portions indicating drivable portions 310 (e.g., which may be depicted with a GREEN highlight that is a colored overlay on the image data) and non-drivable portions 320 (e.g., which may be depicted with a RED highlight that is a colored overlay on the image data) in the environment. The user interface may display an unannotated RGB image data 305 captured from the camera 104 (FIG. 1) that corresponds to an image of the environment. When in an editing or annotating mode a second panel and interactive toolset may be made available to a user. For example, interactive editing and annotating tools 340 may be selectable. This may include a paint brush tool that enables a user to paint portions of an environment captured in displayed image data as either drivable or non-drivable. For example, the second panel may also include an annotatable image 350 and an output image 360 depicting the predicted drivable portion 361 and predicted non-drivable portion 362 of the environment as an overly applied to the RGB image data 144 (e.g. FIG. 1). The annotatable image 350 is editable by a user such that a painting tool, for example, may be selected and utilized to highlight portions of the annotatable image 350 to indicate drivable and/or non-drivable portions. As depicted, square 351 illustrates an annotated portion of the image of the environment that has been highlighted, for example, in green, to indicate the portion of the environment is drivable. The neural network 200 (FIG. 2) for example, may have identified this portion (i.e., square 351) of the environment as non-drivable because an object was detected, for example, a piece of paper on the floor. However, by annotating the annotatable image 350 with a "drivable" highlight over the portion of the image of the environment that indicates the object that was predicted as not being traversable, the support vector machine 230 may properly classify the dataset associated with that portion of the image of the environment as drivable. The annotated annotatable image 350 is an example of the annotated environment image data 250 referred to in the description of FIG. 2. In some instances, the update may cause or require the hyperplane 235 (FIG. 2) to be updated to account for the corrected classification of the portion of the image data. In some embodiments, a user may utilize tools provided by the user interface to alter, add, or delete drivable and/or non-drivable portions. The annotated environment image data 250 (e.g., FIG. 2) will then be fed into the support vector machine 230 to update the hyperplane 235.

Turning to FIG. 4 another screenshot of an illustrative user interface is depicted. The environment model 300 may include a depiction of the location of the robot 330, drivable portions 310, and non-drivable portions 380. As noted the environment model 300 depicted in FIG. 4 is generated subsequent to the updates entered as depicted by the annotatable image 350 in FIG. 3. That is, the non-drivable portion 320 (FIG. 3) in the middle of the environment of FIG. 3 has now been trained to be drivable via the updates made to the support vector machine 230, as illustrated by the absence of the previously depicted non-drivable portion 320 in FIG. 3, but now is depicted as a drivable portion 310 in FIG. 4.

Turning to the right side panel of the user interface depicted in FIG. 4 another example annotatable image 355 is depicted. The example annotatable image 355 is an image that captures the floor around a desk fixture 315 which is subsequently depicted with a non-drivable overlay 366 in the predicted traversability output image 365. Additionally, the floor around the desk fixture 315 is depicted with a drivable overlay 367 indicating that the classifier system has determined that portion of the environment is traversable.

Figure 5:
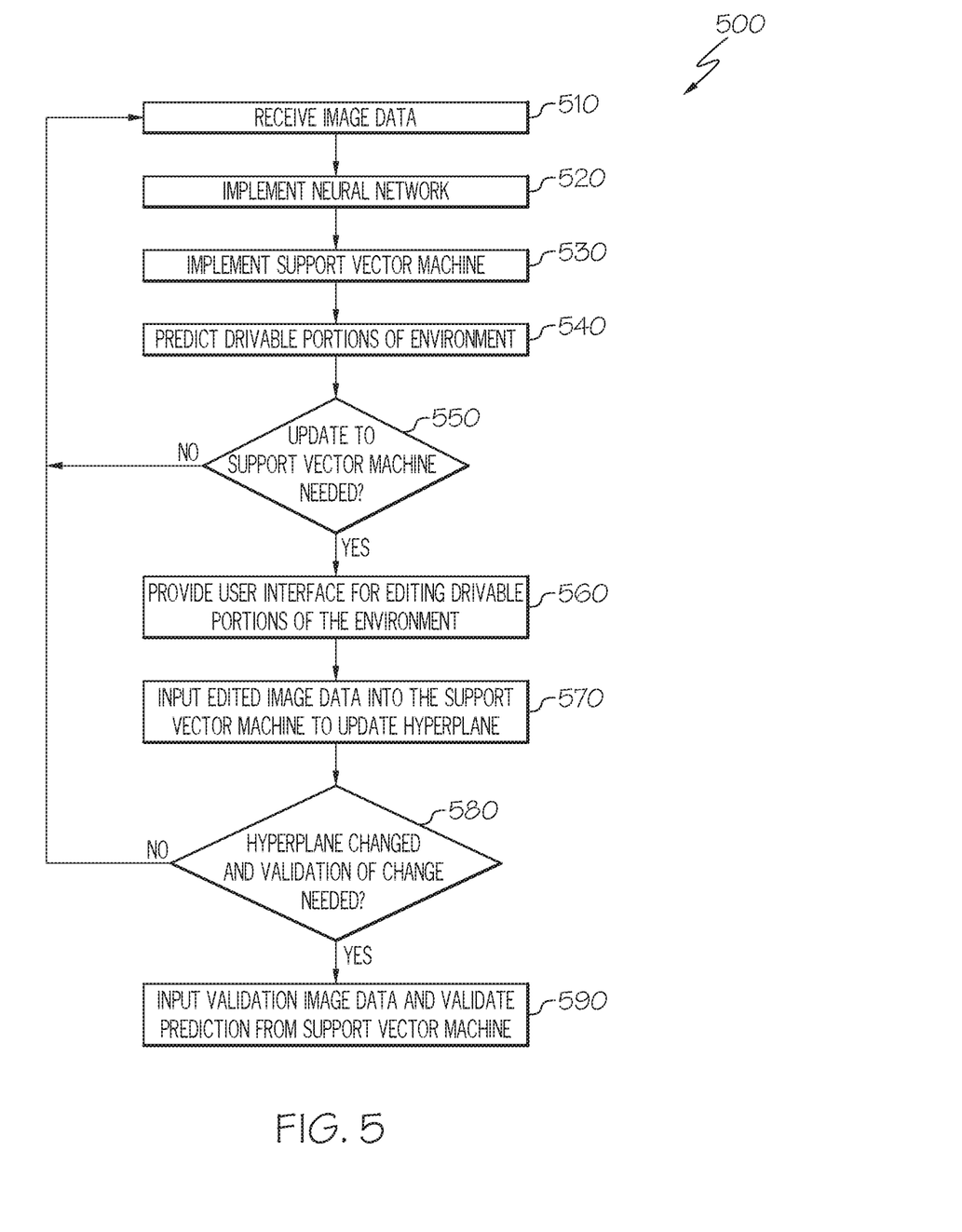
FIG. 5 depicts an illustrative flow diagram for predicting drivable and non-drivable portions of an environment and updating the classifier system according to one or more embodiments shown and described herein.

Turning to FIG. 5, an illustrative flow diagram 500 for predicting drivable and non-drivable portions of an environment and updating the classifier system (e.g., the traversability network illustrated in FIG. 2) is depicted. At block 510, image data is received by an electronic controller (e.g., image data 144 is received by the electronic controller 102 from the camera 104). When training the neural network 200 (e.g., neural network 200, FIG. 2) the image data may be training image data 138B received from a data storage component (e.g. the data storage component 136 of the electronic controller 102 or other computing device) for training the neural network 200. In some instances, the image data may be a dataset from the validation image data 138A. For example, from time to time, image data from the validation image data 138A may be inserted into the neural network 200 and process as described below with respect to blocks 520-540. If a prediction is made by the classifier system that is contrary to the know results that are expected when processing the known image data from the validation image data 138A, at block 550, a determination may be made that an update to the support vector machine in needed, which will be discussed in more detail herein.

At block 520, the electronic controller 102 implements a neural network 200 (e.g., a neural network trained to predict drivable portions of an environment from image data). The implementation of the neural network may include loading logic (e.g., the logic for implementing the neural network 146 as depicted and described with reference to FIGS. 1 and 2) for operating a trained neural network on the electronic controller 102.

At block 530, the electronic controller 102 implements a support vector machine (e.g., support vector machine 230, FIG. 2). The implementation of the support vector machine 230 may include loading the logic (e.g., logic for implementing the support vector machine 148 as depicted and described with reference to FIG. 1) for operating the support vector machine on the electronic controller 102. At block 540, the image data 144 received at block 510 is processed by the neural network 200 and support vector machine 230 to generate a prediction and/or determination of drivable and/or non-drivable portions of an environment captured in the image data 144. In some embodiments, the neural network 200 predicts a drivable portion and/or non-drivable portion in the image data of the environment and the support vector machine determines whether the predicted drivable portion of the environment output by the neural network is classified as drivable based on a hyperplane of the support vector machine. The electronic controller, at block 540, may also output an indication of the drivable portion of the environment. This indication may be utilized by one or more other robot or vehicle systems such as a navigation or motor drive system that controls motion of a robot or vehicle.

The prediction of drivable (or also referred to herein as the traversable area of an environment) may be utilized by a robot and/or autonomous vehicle for supporting navigation functions, a driver support system such as a collision detection in a vehicle to provide semi-autonomous control of a vehicle or alerts to a driver or the like. However, since no two environments are identical, the classifier system (traversability network) may need to be updated from time to time with new data or encounters within new environments. While retraining a neural network is one option, this process is a very cumbersome, data intensive, and a time consuming task. Such resources are not available to a system operating in an environment. Therefore, when updates are required to the classifier system (traversability network) there needs to be systems and methods for doing so while the classifier system (traversability network) remains online. In yet further embodiments, a user may manually interface with the system and request that an update be made to the support vector machine.

At block 550, a determination is made as to whether the classifier system (traversability network) needs to be updated. The determination that an update is needed may be made when a prediction made by the neural network 200 is contrary to a classification that is made by the support vector machine 230. The determination that an update is needed may result from an instance where a prediction based on image data from the validation image data 138A conflicts to the expected results.

In instances where an update is not determined to be needed, for example a "NO" determination is made at block 550, the method may return to block 510 to retrieve or receive a new image data 144. However, in instances wherein an update is determined, for example a "YES" determination is made at block 550, the process advances from block 550 to block 560. At block 560, a user interface (e.g., the user interface depicted and described with respect to FIGS. 3 and 4) is generated and displayed on a display (e.g., display 106, FIG. 1). The user interface may include one described with reference to FIGS. 3 and 4 above that enables the interactive editing of drivable and non-drivable portions within image data of the environment. The annotated environment image data 250 (FIG. 2) generated at block 560 is input into the support vector machine to update the hyperplane (e.g., hyperplane 235, FIG. 2) at block 570. Processing of the annotated environment image data 250 may cause the support vector machine 230 to re-optimize the hyperplane 235. In some embodiments, at block 570 the electronic controller may receive annotated image data of a new environment thereby causing an automatic update of the hyperplane of the support vector machine based on the predicted drivable portions of the environment output by the neural network. That is the annotated image data of a new environment is input to the support vector machine to update the support vector machine online without retraining the neural network.

At block 580, a determination is made as to whether a change was made to the hyperplane and if the traversability network needs to be validated due to the online updates. If a "NO" determination is made at block 580, the method returns to block 510. If a "YES" determination is made at block 580, the process advances to block 590 where the validation image data 138A is retrieved and input to the traversability network and the output of the traversability network is compared with the expected results that correspond to the selected validation image data used for the validation. If the expected results are within a predefined margin of error and/or result in expected predictions the traversability network is determined to be valid, otherwise, the traversability network is determined not to be valid and the prior update to the hyperplane is reversed. Instances of the present flow diagram 500 for predicting drivable and non-drivable portions of an environment and updating the classifier system (e.g., the traversability network illustrated in FIG. 2) may be executed continuously by a robot, an autonomous vehicle, a driver support system, or the like.

It should be understood that steps of the aforementioned process may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that embodiments described herein are directed to systems and methods that provide a traversability network having a neural network and a support vector machine. In some embodiments, a robot system includes a memory module configured to store image data captured by a camera; and an electronic controller communicatively coupled to the memory module. The electronic controller is configured to receive image data captured by the camera, implement a neural network trained to predict drivable portions of an environment from image data, where the neural network receives image data from the camera and predicts drivable portions of an environment captured in the image data, and implement a support vector machine, where the support vector machine receives the predicted drivable portions of the environment output by the neural network and adjusts the predicted drivable portions of the environment output by the neural network based on a hyperplane of the support vector machine.

In some embodiments, the hyperplane of the support vector machine may be updated by using a user interface to edit annotations or predictions of drivable and non-drivable portions of an environment. These updated sets of image data are fed into the support vector machine to relearn weights for drivable and non-drivable portions which in turn adjusts the hyperplane while the traversability network remains online. That is, the neural network does not need to be retrained offline.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
a memory module configured to store image data captured by a camera; and
an electronic controller communicatively coupled to the memory module, wherein the electronic controller is configured to:
receive the image data captured by the camera;
implement a neural network trained to predict a drivable portion in the image data of an environment, wherein the neural network predicts the drivable portion in the image data of the environment;
implement a support vector machine, wherein the support vector machine determines whether the predicted drivable portion of the environment output by the neural network is classified as drivable based on a hyperplane of the support vector machine;
in response to the support vector machine determining that the predicted drivable portion output by the trained neural network is not classified as drivable based on the hyperplane,
receive an annotated image data of the image data captured by the camera,
re-optimize the hyperplane of the support vector machine based on the annotated image data, and
cause the system to reprocess the image data captured by the camera; and
output an indication of the drivable portion of the environment.

2. The system of claim 1, wherein the neural network is trained offline with a plurality of images of environments that are annotated with drivable portions or non-drivable portions.

3. The system of claim 1, wherein the electronic controller is further configured to:
provide a user interface on a display, wherein the user interface includes the image data;
provide an interactive tool for editing or annotating drivable portions of the environment captured in the image data; and
update the hyperplane of the support vector machine based on the annotated image data.

4. The system of claim 3, wherein the interactive tool includes a painting tool whereby a user highlights portions of the image data displayed on the display to indicate the drivable portion of the environment.

5. The system of claim 3, wherein the drivable portion of the environment is depicted as a colored overlay on the image data presented on the user interface.

6. The system of claim 1, wherein the electronic controller is further configured to:
automatically update the hyperplane of the support vector machine based on the predicted drivable portion of the environment output by the neural network, when annotated image data of a new environment is input to the support vector machine, thereby updating the support vector machine online without retraining the neural network.

7. The system of claim 1, wherein the memory module further includes validation image data, and
the electronic controller is further configured to:
retrieve a validation image from the validation image data;
process the validation image through the neural network and the support vector machine such that a prediction of a drivable portion in the validation image is generated; and
confirm the predicted drivable portion in the environment output by the support vector machine corresponds to an expected prediction associated with the validation image from the validation image data.

8. The system of claim 7, wherein the validation image data includes one or more validation images that are annotated with known drivable portions of the environment.

9. A method for predicting drivable portions of an environment, the method comprising:
receiving, with an electronic controller, image data captured by a camera;
implementing, with the electronic controller, a neural network trained to predict a drivable portion in the image data of the environment;
predicting, with the neural network, the drivable portion in the image data of the environment;

implementing, with the electronic controller, a support vector machine;

determining, with the support vector machine, whether the predicted drivable portion of the environment output by the neural network is classified as drivable based on a hyperplane of the support vector machine;

in response to the support vector machine determining that the predicted drivable portion output by the trained neural network is not classified as drivable based on the hyperplane, receiving an annotated image data of the image data captured by the camera, re-optimizing the hyperplane of the support vector machine based on the annotated image data, and causing the system to reprocess the image data captured by the camera; and outputting an indication of the drivable portion of the environment.

10. The method of claim 9, wherein the neural network is trained offline with a plurality of images of environments that are annotated with drivable portions or non-drivable portions.

11. The method of claim 9, further comprising:

providing a user interface on a display, wherein the user interface includes the image data;

providing an interactive tool for editing or annotating drivable portions of the environment captured in the image data; and updating the hyperplane of the support vector machine based on the annotated image data.

12. The method of claim 11, wherein the interactive tool includes a painting tool whereby a user highlights portions of the image data displayed on the display to indicate the drivable portion of the environment.

13. The method of claim 11, wherein the drivable portion of the environment is depicted as a colored overlay on the image data presented on the user interface.

14. The method of claim 9, further comprising:

automatically updating the hyperplane of the support vector machine based on the predicted drivable portion of the environment output by the neural network, when annotated image data of a new environment is input to the support vector machine, thereby updating the support vector machine online without retraining the neural network.

15. The method of claim 9, further comprising:

retrieving a validation image from validation image data;

processing the validation image through the neural network and the support vector machine such that a prediction of a drivable portion in the validation image is generated; and confirming the predicted drivable portion in the environment output by the support vector machine corresponds to an expected prediction associated with the validation image from the validation image data.

16. The method of claim 15, wherein the validation image data includes one or more validation images that are annotated with known drivable portions of the environment.

17. A method for predicting drivable portions of an environment, the method comprising:

receiving, with an electronic controller, image data captured by a camera;

annotating the image data through a user interface generated by the electronic controller on a display, wherein one or more portions of the image data are annotated as drivable using an interactive tool;

implementing, with the electronic controller, a support vector machine configured to receive a prediction of a drivable portion of the environment from a neural network trained to predict the drivable portion of the environment, determining, with the support vector machine that the predicted drivable portion of the environment output by the neural network is not classified as drivable based on a hyperplane of the support vector machine; and updating the hyperplane of the support vector machine based on the annotated image data such that a constraint defining the hyperplane is changed, in response to determining that the predicted drivable portion is not classified as drivable based on the hyperplane.

18. The method of claim 17, further comprising:

receiving, with the electronic controller, a second image data captured by the camera;

implementing, with the electronic controller, the neural network trained to predict the drivable portion in the second image data of the environment;

predicting, with the neural network, the drivable portion in the second image data of the environment;

determining, with the support vector machine, whether the predicted drivable portion of the environment output by the neural network is classified as drivable based on an updated hyperplane of the support vector machine; and outputting an indication of the drivable portion of the environment.

19. The method of claim 17, further comprising:

retrieving a validation image from validation image data;

processing the validation image through the neural network and the support vector machine such that a prediction of a drivable portion in the validation image is generated; and confirming the predicted drivable portion in the environment output by the support vector machine corresponds to an expected prediction associated with the validation image from the validation image data.

20. The method of claim 19, wherein the validation image data includes one or more validation images that are annotated with known drivable portions of the environment.

* * * * *